Figure 1:
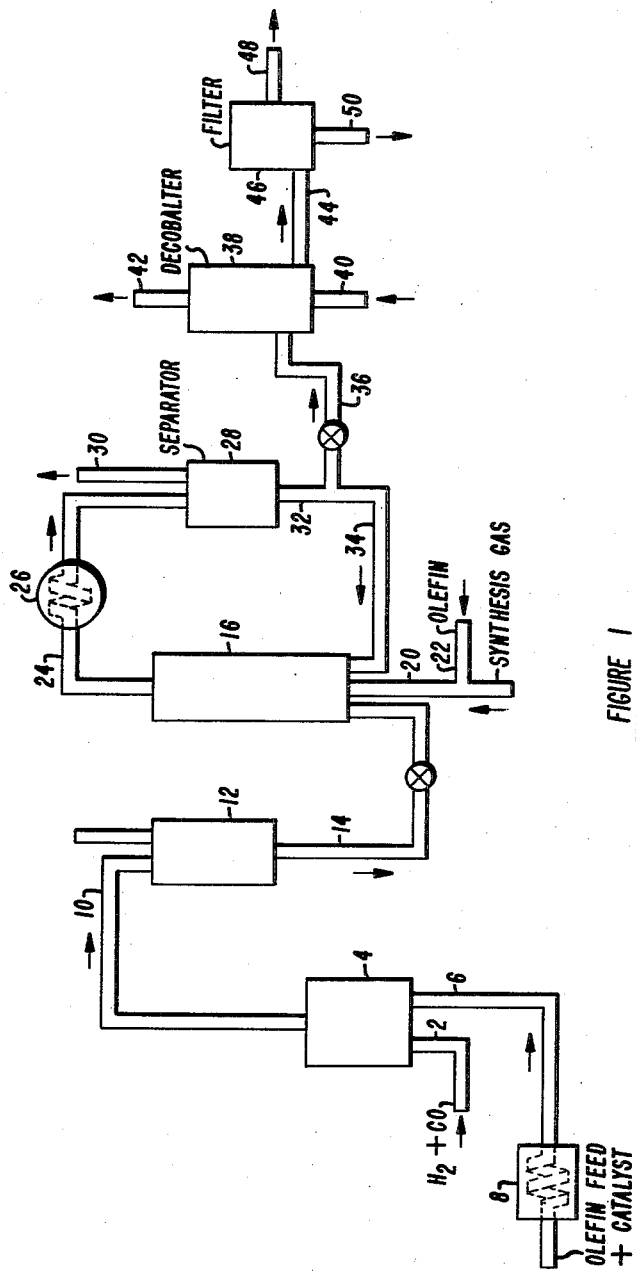

March 18, 1958     J. K. MERTZWEILLER     2,827,491
LOW PRESSURE OXO SYNTHESIS

Filed March 10, 1955     3 Sheets-Sheet 1

JOSEPH K. MERTZWEILLER     INVENTOR

BY Richard N. Nagel ATTORNEY

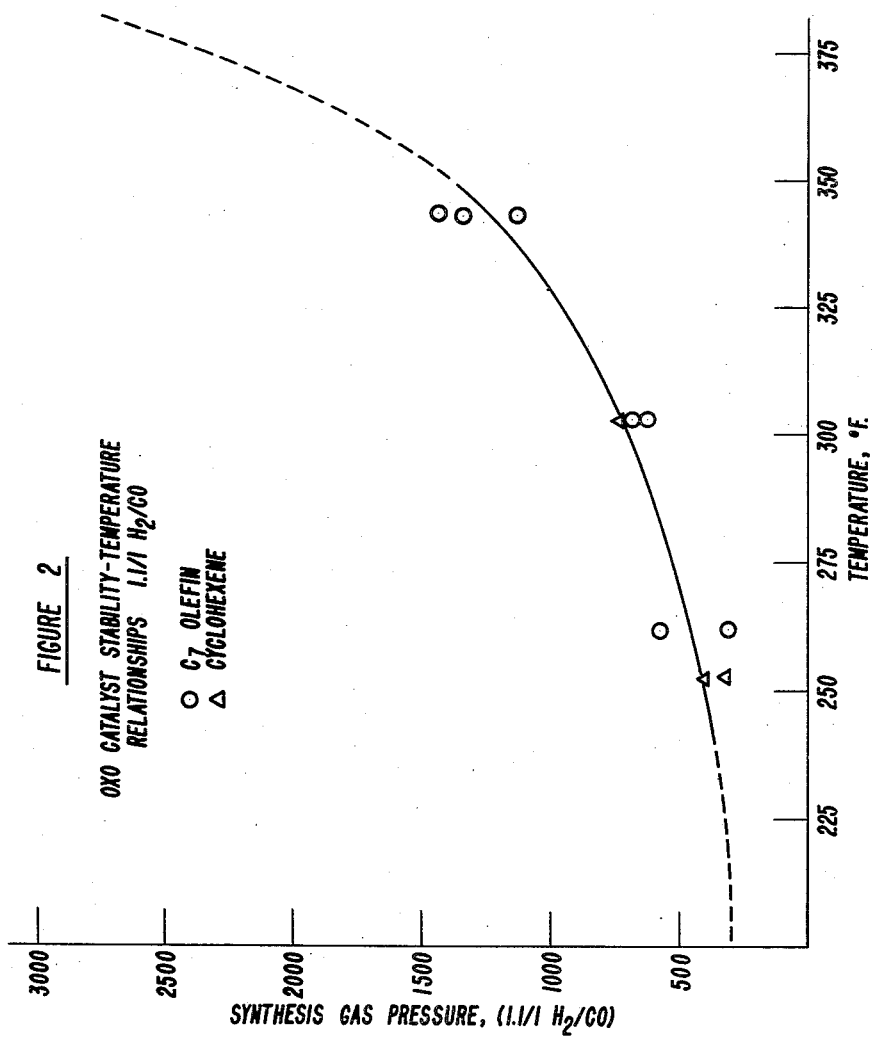

March 18, 1958   J. K. MERTZWEILER   2,827,491
LOW PRESSURE OXO SYNTHESIS
Filed March 10, 1955   3 Sheets-Sheet 3
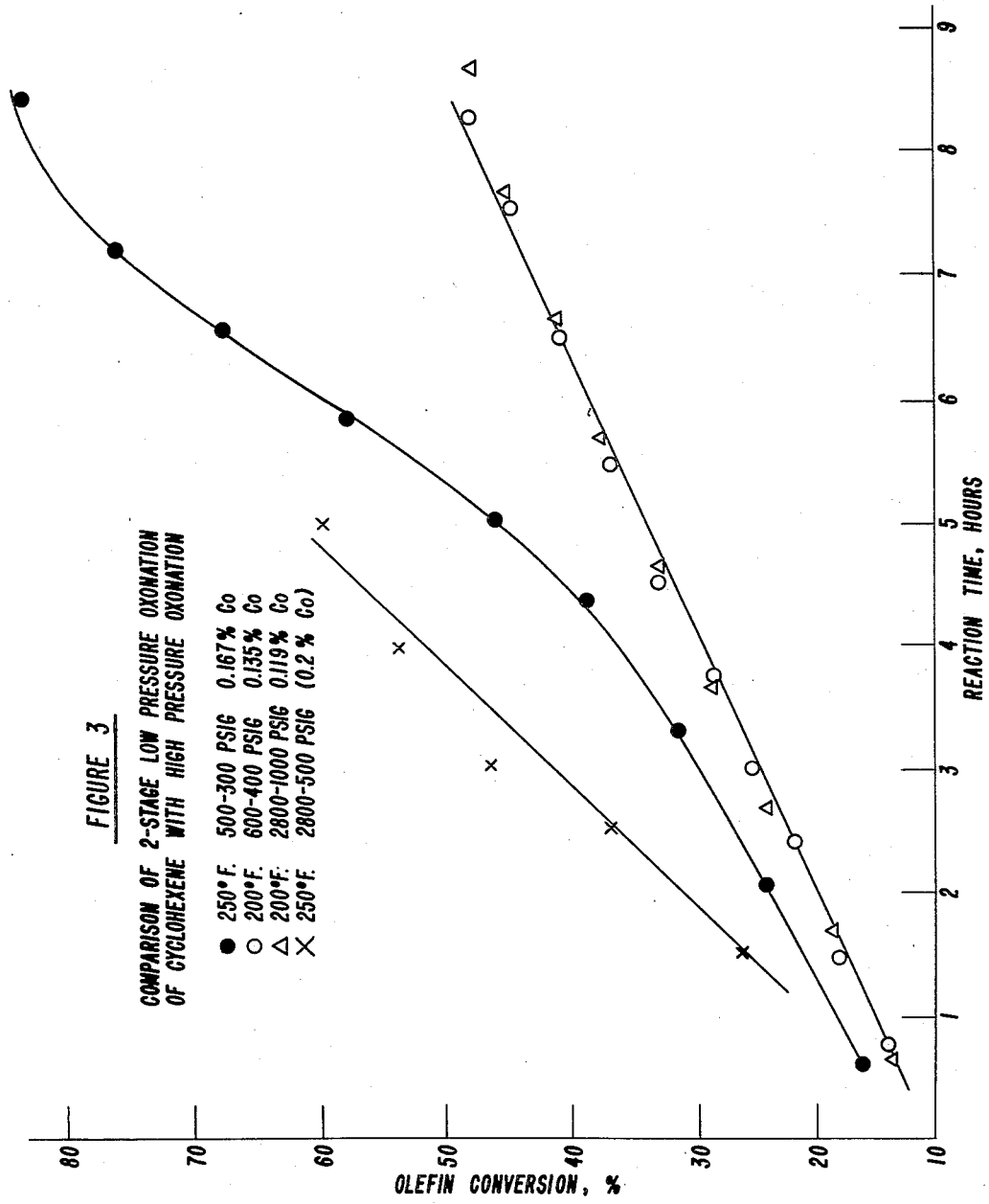
JOSEPH K. MERTZWEILLER   INVENTOR
BY Richard N. Nagel   ATTORNEY United States Patent Office 2,827,491
Patented Mar. 18, 1958

2,827,491
LOW PRESSURE OXO SYNTHESIS

Joseph K. Mertzweiller, Baton Rouge, La., assignor to Esso Research and Engineering Company, a corporation of Delaware Application March 10, 1955, Serial No. 493,514

10 Claims. (Cl. 260—604)

The present invention relates to the preparation of oxygenated organic compounds by the reaction of carbon monoxide and hydrogen with olefinic linkages in the presence of a cobalt catalyst. More specifically, the present invention relates to an improved process wherein the catalyst is reacted with olefinic compounds, CO, and $H_2$ at pressures substantially lower than those employed hitherto.

The aldehyde synthesis, or Oxo, reaction wherein aldehydes are formed from olefins, is now well known. The reaction is carried out in the presence of a cobalt catalyst, and generally involves two steps. In the first, the olefinic material, catalyst and proper proportions of CO and $H_2$ are reacted at superatmospheric pressures of about 2500-4000 p. s. i. g. and elevated temperatures of 300-400° F. to give a product consisting predominantly of aldehydes having one more carbon atom than the reacted olefin. This product, which contains in solution such compounds as the carbonyls of cobalt, is then treated in a second step to remove soluble metal compounds and complexes in a catalyst removal zone. This is generally accomplished by thermal treatment in the presence of an inert gas, water, steam, dilute acid, and the like. The catalyst-free material is then generally hydrogenated to the corresponding alcohol.

This carbonylation reaction provides a particularly attractive method for preparing valuable primary alcohols which find large markets, particularly as intermediates for plasticizers and detergents. Amenable to the reaction are long and short chain olefinic compounds, depending upon the type alcohols desired. Not only olefins, but most organic compounds possessing at least one aliphatic carbon-carbon double bond may be reacted by this method. Thus, straight and branched chain olefins and diolefins such as propylene, butylene, pentene, hexene, butadiene, pentadiene, styrene, olefin polymers such as those obtained by catalytic polymerization of propylene and butylene, etc., polypropylene, olefinic fractions from the hydrocarbon synthesis process, thermal or catalytic cracking operations, and other sources of hydrocarbon fractions containing olefins, may be used as starting material depending upon the nature of the final product desired.

The catalyst in the first stage of the process may be added in the form of salts of the catalytically active metal with high molecular weight fatty acids such as stearic, oleic, palmitic, naphthenic, etc. Thus, suitable catalysts are, for example, cobalt oleate or naphthenate. These salts are soluble in the liquid olefin feed or in the liquid products from the reaction and may be supplied to the first stage as hydrocarbon solution or dissolved in the olefin feed or in a stream of recycle products. Also, it has been proposed to employ catalyst deposited on a carrier, preferably activated with thoria, in the form of a slurry and employ the supported cobalt material in the slurry rather than the metal soap. It has also been proposed to employ other insoluble forms of cobalt such as cobalt oxide, carbonate, the reduced metal, etc.

The synthesis gas mixture fed to the first stage may consist of any desired ratio of $H_2$ to CO, but preferably, these gases are present in about equal volumes. The conditions for reacting olefins with $H_2$ and CO vary somewhat in accordance with the nature of the olefin feed. But the reaction has generally been conducted at pressures in the range of about 2500 to 4500 p. s. i. g. and at temperatures of about 300° to 400° F. The ratio of synthesis gas to olefin feed may vary widely, in general about 2500 to 15,000 cubic feet of $H_2$+CO per barrel of olefin feed are employed.

At the end of the first stage when the desired conversion of olefins to oxygenated compounds has been effected, the product and the unreacted material are generally withdrawn to a catalyst removal zone where dissolved catalyst is removed from the mixture usually by a thermal process in the presence of a stripping gas, steam, or even chemical means.

It has been reasonably well substantiated that the active species of the catalyst is a carbonyl of the metal, probably the hydrocarbonyl. Thus, when cobalt is added as an insoluble solid or as a solution of a metallic soap, it has been found that cobalt carbonyl is always formed and when cobalt carbonyl is added to the reaction, cobalt material is obtained after the reaction is completed and the product decobalted. There are, however, vast differences in reaction rates between the various forms of cobalt. A cobalt soap is converted into cobalt carbonyl at a considerably faster rate than is a hydrocarbon-insoluble form of cobalt such as either metal or cobalt oxide. Accordingly, when an insoluble form of cobalt is employed as a catalyst, it requires a considerably longer residence time for the formation of the active catalyst than does the utilization of the more easily converted cobalt soap and when it is desired to employ the insoluble forms of catalyst and use at the same time, liquid and gas throughput rates that are feasible with soluble cobalt soap in a continuous reaction, it has been found that a large proportion of the solid insoluble cobalt passes through the reaction zone without being converted at the reaction conditions, into cobalt carbonyl. This cobalt would have to be recovered, and represents a significant loss in reactor capacity as well as additional equipment necessary for the recovery of cobalt. It is, therefore, evident that it would be highly desirable to provide a process for employing solid, readily available sources of cobalt such as cobalt oxide which would react to form cobalt carbonyl at rates equivalent to those of oil soluble cobalt compounds.

The following table, the result of extensive kinetic studies, illustrates the difference in reaction rates under similar reaction conditions, of various forms of cobalt. The rate constants $k$ and oleate comparison factors K, defined by the relationship $$K = \frac{(k) \text{ cobalt oleate}}{(k) \text{ catalyst}}$$

are summarized by the results below. The oleate comparison factor gives a direct measure of the activity of cobalt oleate with reference to the other forms of cobalt catalyst in question.

| Catalyst | Rate Constant $(k)$ Min.$^{-1}$ ($\times 10^3$) | Oleate Comparison Factor (K) |
|---|---|---|
| Cobalt Oleate | 85.6 | |
| Cobalt Oxide | 6.0 | 14.2 |
| Cobalt Metal | 2.9 | 29.5 |
| Cobalt Carbonate (ous) | 5.3 | 16.1 |
| Cobalt Oxalate (ous) | 4.9 | 17.5 |
| Cobalt Formate (basic) | 4.8 | 17.8 |

These data show that cobalt oleate gives about 14 times the reaction rate obtainable with cobalt oxide and about 30 times the rate characteristic of cobalt metal, the other insoluble salts having intermediate values, all far poorer than soluble cobalt oleate. Thus it can readily be seen that insoluble forms of cobalt are much poorer than soluble forms from the standpoint of reaction velocity in the Oxo process.

It has also been found that the conversion of solid forms of cobalt such as cobalt oxide, into cobalt carbonyl proceeds at a considerably higher rate when, in the presence of an $H_2$ and CO comprising gas, the temperature is maintained at about 150 to 250° F. at pressures of 2500–3500 p. s. i. g. than when the temperature is maintained at aldehyde synthesis reaction temperatures, that is, at 300–375° F. Under the carbonyl forming conditions, however, relatively little olefin conversion is obtained; also higher conversion than about 25% must be avoided, for the highly exothermic aldehyde synthesis reaction makes difficult the concentration of large amounts of the active catalyst species. When appreciable aldehyde conversion occurs, the temperature is of necessity in the region above that favoring rapid formation of carbonyl from cobalt oxide.

As set forth above, it has hitherto been necessary to carry out the olefin conversion to aldehydes at high pressures of the order of 2000–4500 p. s. i. g. Experience has shown that at lower pressures the reaction is either incomplete or if complete, the rate is too slow for a commercially practicable operation. Thus, at 50 atmospheres (750 p. s. i. g.) the rate is about a third of what it is at 200 atmospheres. Also, it is known that the carbonylation reaction can be carried out at atmospheric or near atmospheric pressures, but under these conditions the reaction is not only extremely slow but also not a truly catalytic reaction; thus cobalt hydrocarbonyl is required in stoichiometric rather than catalytic quantities in such reactions. It would be highly advantageous to carry out the Oxo conversion at the lower pressures, because of the huge savings in plant investment and maintenance costs. Furthermore, since lower pressure operations generally are accompanied by fewer concurring secondary reactions, a purer product would be available.

It is, therefore, an object of the present invention to provide an improved process for carrying out a truly catalytic aldehyde synthesis reaction by employing substantially lower pressures than hitherto required and at rates equivalent to those contained hitherto at much higher pressures at equivalent temperatures.

It is also an object of the present invention to maintain high olefin conversions employing initially solid forms of cobalt at gas and olefin throughput rates normally associated with oil-soluble catalysts.

Another object is to provide a novel useful method of carbonylating the most highly reactive olefins, specifically the lower molecular weight $C_2$–$C_6$ straight chain olefins.

Other and further objects and advantages of the invention will in part be obvious and will appear hereinafter.

These objects and advantages may, in brief, be achieved by employing a two-stage rather than a single stage oxonation system, wherein, in the first stage, reaction conditions are maintained to maximize conversion of cobalt, whether added as oxide, metal, or salt, to active catalyst. This is carried out in the presence of CO and $H_2$ in the presence of a liquid vehicle, such as the olefin feed or the aldehyde product or a mixture of these. Reaction conditions in this zone include the normally high pressures associated with the Oxo reaction itself, i. e. 2000–3500 p. s. i. g. Temperatures, however, are substantially lower, being less than 350° F. and preferably about 175–250° F. At these conditions, formation of active catalyst is extremely rapid but reaction between the catalyst and any olefin present is not greatly favored. For this purpose a relatively small high pressure reactor will suffice to prepare large quantities of the active catalyst.

The actual carbonylation reaction must be carried out in conformity with pressure-temperature relationships which critically influence the stability of the catalyst, and which enable the oxonation to be carried out at relatively low pressures of 300–750 p. s. i. g.

This relation is critical because the temperature conditions cannot be exceeded at any given pressure without destroying the catalytic properties and usual kinetics of the carbonylation reaction. Conditions are defined in terms of total pressure with approximately 1/1 $H_2$/CO synthesis gas. This gas composition is optimum for most systems. Slight variations of a few tenths of a unit from the 1/1 ratio will not have an appreciable effect but large variations in either direction tend to considerably reduce the reaction rate. Variations in the direction of increasing $H_2$/CO ratio are tolerated more readily than decreasing the $H_2$/CO ratio.

In the first stage of the present invention a linear velocity of about 0.004–0.01 ft./second is preferably maintained, in conjunction with the low temperature levels referred to above. In the second stage, a considerably higher linear velocity in the range of 0.05–0.1 ft./second is employed, at a temperature dictated by the stability of the catalyst at the low pressure to take advantage of the favorable conversion conditions obtained at that temperature. The gas streams and, if desirable, the olefin streams are split, in the latter case about 5–20% of the olefin feed being introduced into the first zone, and synthesis gas being admitted in proportions to give the desired linear velocities above. However, it is not essential that the olefin feed be split. It contributes only a small portion of the total linear velocity and all may be passed through both stages.

In accordance with the present invention, therefore, a slurry or paste of insoluble catalytic material and all or a portion of the fresh or partially converted feed is passed to the first stage of reactor. A synthesis gas mixture comprising $H_2$ and CO in a ratio of about 1 to 1 is passed into the first stage reactor, and maintained at pressures about 2500 to 3500 p. s. i. g. The temperature level maintained therein is about 150–250° F., preferably 175–225° F. The total effluent from the first stage is then passed to a second stage wherein the temperature is raised to 200–300° F., the pressure reduced to 300–750 p. s. i. g. and conversion is completed. The total throughput of gas and liquid is adjusted to give the desired conversion level, generally in the range of 70–80 mol percent. In general the size of the second stage is considerably larger than the first stage.

The present invention will best be understood from the more detailed description presented hereinafter, wherein reference will be made to the accompanying drawings which are schematic illustrations of systems suitable for carrying out preferred embodiments of the invention.

Referring now to Figure 1, which is a two-vessel aldehyde synthesis reactor, an olefinic hydrocarbon having one less carbon atom than the number of carbon atoms in the desired resulting oxygenated compound is fed through feed line 6 to the bottom portion of first stage reactor 4. Simultaneously there is introduced through line 6 and preheater 8, a slurry, suspension, or paste comprising a solid olefin-insoluble form of cobalt, such as cobalt oxide, carbonate, basic formate, metal, or other readily available forms of this metal suspended or dispersed in the olefin. When a paste is employed, such may be prepared by mixing finely-divided powder with about 50% by weight of petrolatum; pump erosion and solids settling are thereby minimized. The amount of catalyst added is about 0.02–0.5% by weight of the total olefin to be converted to aldehyde and alcohol product. Inasmuch as it may be desirable to split the olefin feed stream between the first and second primary reaction stages, and since all the catalyst is added in the first stage reactor 4, it is evident that the proportion of cobalt to olefin may be greater than these figures.

Within reactor 4, a pressure of $H_2$ and CO of about 2500–3500 p. s. i. g. is maintained, and a temperature level of 150–250° F., preferably 175–225° F. Significantly higher temperatures must be avoided in this stage, due to marked decrease in conversion level of insoluble cobalt compounds to active catalyst. Reaction conditions, feed rates, contact time all are carefully adjusted within reactor 4 to avoid temperatures either higher or lower than the range above, for lower temperatures prevent formation of the catalyst at appreciable rates. Thus liquid feed rates of 0.1 to 5 v./v./hr. and gas rates of 500 to 3000 cu. ft./bbl. of olefin may be employed. It is desirable to take no more than a limited conversion of olefin product in this stage to provide the temperature level designated above.

After sufficient residence time for substantially all of the added solid cobalt to be converted into active catalyst which under the reaction conditions is very rapid, the total effluent is withdrawn overhead through line 10. The effluent comprises olefin, possibly aldehyde product, cobalt catalyst in solution, and is substantially free of suspended or dispersed cobalt solids. This material may advantageously, though not necessarily, be passed through high pressure separator 12, and the liquid withdrawn through line 14 is passed to the bottom portion of second stage primary reactor 16.

Reactor 16 is preferably operated at pressures of about 300 to 750 p. s. i. g. The temperature level is preferably higher, between about 200–300° F., when 1/1 gas is employed. Additional synthesis gas may be added to this stage through line 20, and the balance of the olefin is added through lines 22 and 20 if it is desired to split the feed. Cobalt concentration is 0.02–1.0 wt. percent cobalt based on total olefin feed to both stages. The total gas and liquid throughput is adjusted to give the desired conversion level, generally in the range of 70–80% (mol). The higher temperature level in 16 is controlled by the more complete conversion level of the olefin feed, and by recycle of cooled reactor product as shown below. Because all of the catalyst in reactor 16 is already active, there is no time lag in this reactor necessitated by conversion of other forms of cobalt into the active catalyst species.

In general, stage II is of much greater volume and of relative lower pressure construction than stage I. Stage II may represent 5–20 times the volume of stage I. It is also important to note that temperature levels are of the same order of magnitude in stage II as compared to stage I. This facilitates design and operation of the system and also distinguishes it, along with the pressure relationships, from many of the multi-stage reactions proposed heretofore.

Liquid oxygenated reaction products comprising aldehydes and dissolved cobalt are withdrawn from the upper portion of reactor 16. This material which is at a pressure of about 300–750 p. s. i. g. and at 200–300° F. is passed via line 24 to cooler 26 wherein the total effluent is cooled to about 60–120° F., and is then passed to separator 28, wherein unreacted gases are separated from liquids. The unreacted gases are withdrawn through line 30 and in part recycled.

A stream of liquid aldehyde product containing dissolved cobalt is withdrawn through line 32 and a portion is pumped via line 34 back to reactor 16 to maintain adequate cooling in that zone, and may be injected into 16 at various levels or zones to maintain temperature uniformity. Liquid aldehyde product not recycled may be withdrawn through line 36 and after pressure release and further degassing, is passed to decobalting zone 38 wherein, at pressure of about atmospheric to 500 p. s. i. g., the aldehyde product is heated to about 200–400° F. in the presence of an inert gas, such as hydrogen, or with water or steam, to decompose the cobalt carbonyl and other soluble forms of cobalt, into oil-insoluble material, including cobalt metal, oxides, carbonates, basis carbonates, and formates. The gas aids in stripping and purging evolved CO from the system through line 42. Other decobalting methods may also be used.

Liquid aldehyde reaction products now substantially free of dissolved carbonylation catalyst are withdrawn from catalyst removal zone 38 through line 44, and passed to solids recovery zone 46, wherein solid cobalt material formed as a result of thermal or other treatments in vessel 38 is recovered either by settling, filtration, or other conventional means.

The metal-free liquid product is then withdrawn through line 48 for further processing, preferably to produce alcohols by hydrogenation. Recovered metal and solid cobalt compounds insoluble in olefins and aldehydes may be withdrawn from solids recovery system 46 through line 50, and may be reused in the process by suspending them in the olefin feed passed to first stage reactor 4.

Under certain circumstances it may be desirable to employ oil-soluble forms of cobalt, or even aqueous solutions of cobalt salts. Also, the principal carbonylation reaction may be carried out in several vessels in series rather than in the single vessel shown in the diagram. This has the advantage of increasing the residence time and increasing conversion. Furthermore, because of the lower temperatures employed in conjunction with the lower pressures, the provision for cooling the aldehyde synthesis reactor if desired may be omitted. This factor is an important consideration because the reactor cooling is a large portion of the investment required for a carbonylation plant. This also functions to great advantage with the low molecular weight, highly reactive feeds such as ethylene, propylene, normal and isobutylene, amylenes and hexenes.

The process of the present invention may be further illustrated by the following specific examples.

*Example 1*

The relationship between catalyst stability, temperature and pressure was determined as below, employing as synthesis gas a gas having an $H_2/CO$ ratio of 1.1/1 and is plotted in Figure 2.

This correlation has been derived from individual batch synthesis runs carried out as follows:

With either olefin soluble or olefin insoluble catalyst the reaction is started in the usual manner at about 3000 p. s. i. g., synthesis gas pressure and at the desired temperature. A complete pressure drop chart is obtained, starting at 3000 p. s. i. g., and terminating when no further gas absorption takes place, (generally less than 1000 p. s. i. g.). The system is not repressured at any time. Also, care must be taken to size the olefin charge appropriately such that conversion does not exceed 40–50% at the end of the pressure drop cycle thus insuring that true kinetic relationships will be observed. From the pressure drop chart, either directly or interpreted in terms of conversion, a pressure point is observed at which the reaction deviates from the first order kinetic relationships. This is termed the critical stabilizing pressure for catalytic reaction at that temperature.

From Figure 2 it can be seen that the critical stabilizing pressure of the catalyst is about 350 p. s. i. g. at 250° F., increases to about 1500 p. s. i. g. at 350° F. and increases very greatly with further temperature increase. This also explains why it is impractical to carry out the carbonylation reaction at temperatures much greater than about 350° F.

*Example 2*

The results of several runs comparing the two-stage low pressure process and the conventional high pressure process, employing cyclohexene as the olefin, are shown graphically in Figure 3. In these runs the catalysts were preformed at 1500–3000 p. s. i. g. synthesis gas pressure, 325° F. and 3 hours reaction time using 200 cc. olefin and 7–22 grams solid cobalt acetate. Complete reaction (no further gas absorption) required only about one hour. The autoclave was then cooled, pressure reduced to about 50 p. s. i. g., and 1000 cc. olefin was pressured in. Operations were continued according to the pressure and temperature schedules shown below for each run:

(a) At 200° F. and 400–600 p. s. i. g. the same rate of reaction was obtained as for 200° F. and 2800–1000 p. s. i. g.

(b) At 250° F. the low pressure run initially had a somewhat lower reaction rate than the corresponding high pressure run; thereafter it increased rapidly and the over-all average reaction time equivalent to about 70% conversion would be about the same for the high and low pressure operations.

What is claimed is:

1. In the process for the production of aldehydes from olefins wherein olefinic compounds are contacted with $H_2$, CO and a cobalt catalyst at elevated temperatures and pressures, the improvement which comprises continuously passing to an initial reaction zone a minor portion of the fresh liquid olefin feed, $H_2$, CO and an olefin-insoluble cobalt material dispersed in the liquid olefin feed, maintaining a pressure of about 2000–3500 p. s. i. g. and a temperature of about 150–250° F. in said zone, maintaining a linear gas velocity through said zone no greater than about 0.01 feet/second, maintaining a sufficient residence time of said components within said zone to convert substantially all of said cobalt to cobalt carbonyls but converting not more than a minor proportion of said olefin to aldehyde product, continuously passing liquid effluent from said zone to a second reaction zone of greater volume than said initial reaction zone, passing to said second reaction zone the balance of the fresh olefin feed, passing $H_2$ and CO to said zone, maintaining a temperature of about 200–300° F. and a pressure of about 300–750 p. s. i. g. in said zone, maintaining an olefin conversion level of about 70–80 mol percent in said zone, and withdrawing a product rich in aldehydes from said second reaction zone.

2. The process of claim 1 wherein the temperature in said first zone is about 175–225° F.

3. The process of claim 1 wherein the linear gas velocity through said first zone is about 0.004–0.008 feet/second.

4. The process of claim 1 wherein the linear gas velocity through said second zone is about 0.05 to 0.1 feet/second.

5. The process of claim 1 wherein said cobalt material is cobalt oxide.

6. The process of claim 1 wherein said cobalt material is a salt.

7. The process of claim 1 wherein said cobalt material is decobalter solids recovered from a subsequent cobalt removal stage.

8. The process of claim 1 wherein an aqueous solution of a cobalt compound is passed into said first zone.

9. The process of claim 1 wherein 5–20% of the total olefin feed is passed to said initial zone.

10. A continuous process for the production of aldehydes which comprises continuously passing a cobalt comprising material dispersed in liquid olefin feed, CO and $H_2$ into a first reaction zone, maintaining a pressure of about 2000–3500 p. s. i. g. and a temperature between 150° to 250° F. in said zone with a residence time sufficient to convert at least a major portion of said cobalt comprising material to cobalt carbonyls, removing from said zone in a continuous stream liquid effluent containing cobalt carbonyls, continuously passing said liquid effluent, olefin, $H_2$ and CO to a second zone of larger volume than said first reaction zone, maintaining in said second zone elevated temperatures between 200° to 300° F. and pressures of about 300–750 p. s. i. g., maintaining a residence time in said second zone sufficient to convert at least 70% of the olefin present to oxygenated compounds and continuously withdrawing a liquid effluent rich in aldehydes.

References Cited in the file of this patent

UNITED STATES PATENTS

| | | |
|---|---|---|
| 2,497,303 | Gresham et al. | Feb. 14, 1950 |
| 2,641,613 | Mertzweiller et al. | June 9, 1953 |
| 2,691,046 | Hasek | Oct. 5, 1954 |

OTHER REFERENCES

Wender et al.: Journal of the American Chemical Society, 73, 2656–8 (1951).